3,409,707
Patented Nov. 5, 1968

3,409,707
DI THIO PHOSPHORUS PHOSPHONIUM SALTS
Martin Grayson, Norwalk, Patricia Tarpey Keough, Ridgefield, and Michael McKay Rauhut, Norwalk, Conn., assignors to American Cyanamid Company, Stamford, Conn., a corporation of Maine
No Drawing. Application Feb. 12, 1964, Ser. No. 344,224, now Patent No. 3,299,143, dated Jan. 17, 1967, which is a continuation of application Ser. No. 256,124, Feb. 4, 1963. Divided and this application Oct. 30, 1964, Ser. No. 407,873
4 Claims. (Cl. 260—931)

ABSTRACT OF THE DISCLOSURE

Phosphonium salt derivatives of the formula $$\left[ R_1R_2R_3PCH_2CH_2S\overset{S}{\underset{A'}{\overset{\|}{P}}}\diagdown\overset{A}{\phantom{A}} \right] \oplus X\ominus$$

wherein $R_1$, $R_2$, $R_3$, A, A' and X are as hereinafter defined. The compounds are useful as fire retardants in plastics.

---

The instant application is a division of U.S. application Ser. No. 344,224, filled Feb. 12, 1964, now U.S. Patent 3,299,143, issued Jan. 17, 1967, which in turn was a continuation of U.S. application Ser. No. 256,124 filed Feb. 4, 1963, now abandoned.

The present invention relates to organophosphorus compounds and to a method of preparing same. More particularly, the instant discovery concerns phosphonium salt derivatives of tertiary phosphines.

It has been found that tertiary phosphines generally will react with halo-substituted ethanol to produce the corresponding trialkyl-, tricycloalkyl-, or tri-aryl-2-hydroxyethylphosphonium salts. In turn, these salts may be acylated using a lower alkanoic anhydride, lower alkanoic acid, or the like, to produce their corresponding trialkyl-, tricycloalkyl, or triaryl - 2 - acetoxyethylphosphonium salts.

The following equations illustrate this general reaction:

(A) $R^1R^2R^3P + XCH_2CH_2OH \longrightarrow R^1R^2R^3\overset{\oplus}{P}CH_2CH_2OH \cdot X\ominus$ (B) $R^1R^2R^3\overset{\oplus}{P}CH_2CH_2OH \cdot X\ominus + \xrightarrow{\text{esterifying agent}}$
$R^1R^2R^3\overset{\oplus}{P}CH_2CH_2OY \cdot X\ominus$ $R^1$, $R^2$, $R^3$ each representing, as will be seen hereinafter, alkyl, cycloalkyl and aryl, X representing halogen or tetraphenyl borate, and Y representing the residue of an acylating or esterifying agent. The following is a typical embodiment of generic Equations A and B, above:

$(n-C_4H_9)_3P + BrCH_2CH_2OH \longrightarrow (n-C_4H_9)_3\overset{\oplus}{P}CH_2CH_2OH \cdot Br\ominus$ $(n-C_4H_9)_3\overset{\oplus}{P}CH_2CH_2OH \cdot Br\ominus + CH_3COCl \longrightarrow$
$(n-C_4H_9)_3\overset{\oplus}{P}CH_2CH_2O\overset{O}{\overset{\|}{C}}CH_3 \cdot Br\ominus$ The trialkyl-, tricycloalkyl-, and triaryl - 2 - acetoxyethylphosphonium salts prepared as above may, in turn, be converted to their corresponding vinylphosphonium salts according to the following general equation:

(C) $R^1R^2R^3\overset{\oplus}{P}CH_2CH_2OY \cdot X\ominus \xrightarrow{\text{base}} R^1R^2R^3\overset{\oplus}{P}CH=CH_2 \cdot X\ominus$ in which $R^1$, $R^2$, $R^3$, Y and X are the same as above.

The following is a typical embodiment of equation (C), above:

$(CH_3)_3\overset{\oplus}{P}CH_2CH_2O\overset{O}{\overset{\|}{C}}CH_3 \cdot Cl\ominus \xrightarrow{Na_2CO_3} (CH_3)_3\overset{\oplus}{P}CH=CH_2 \cdot Cl\ominus$ More specifically, in generic Equations A, B and C, above, $R^1$, $R^2$ and $R^3$ each represent alkyl $C_1$–$C_{16}$, substituted alkyl $C_1$–$C_{16}$, cycloalkyl, and aryl; X represents halogen, such as bromo, chloro and iodo, and tetraphenyl borate; and Y in Equations B and C represents the residue of an acylating agent as shown in the specific embodiments, supra.

Typical tertiary phosphine reactants are the following: trimethylphosphine, tirethylphosphine, tripropylphosphine, tributylphosphine, tripentylphosphine, trihexylphosphine, triheptylphosphine, trioctylphosphine, trionylphosphine, tridecylphosphine, triundecylphosphine, tridodecylphosphine, tritridecylphosphine, tritetradecylphosphine, tripentadecylphosphine, trihexadecylphosphine, dodecyldiethylphosphine, dioctylpropylphosphine, diethylbutylphosphine, butylethylhexylphosphine, tri(2-methoxypentyl)phosphine, tris - 2 - cyanoethylphosphine, diethyl - 2 - ethoxyheptylphosphine, tricyclopropylphosphine, tricyclohexylphosphine, triphenylphosphine, diphenylnaphthylphosphine, trixylylphosphine, tritolylphosphine, tris(para - ethoxyphenyl)phosphine, tris (para - chlorophenyl)phosphine, tris(2 - chlorophenyl) phosphine, tris(3 - bromophenyl)phosphine, and the like.

Typical esterifying agents follow: lower alkanoic anhydrides, such as acetic anhydride, propionic anhydride, butanoic anhydride; lower alkanoic acids, such as formic acid, acetic acid, propionic acid, butanoic acid; acylating ($C_2$–$C_{18}$ alkanoyl) halides, such as acetyl chloride, propionyl bromide, butyryl iodide, octanoyl chloride, dodecanoyl bromide, stearyl chloride, hexanoyl bromide; isopropenyl acetate; aryl sulfonyl halides, such as para - toluenesulfonyl chloride, phenyl sulfonyl bromide, 2,4 - dimethylphenylsulfonyl chloride; alkyl (lower) chloroformates, such as ethylchloroformate, butylchloroformate; alkyl (lower) carbonates, such as diethylcarbonate, dipropylcarbonate, dibutylcarbonate; ketene; dimethyl sulfate; nitrosyl chloride; and trimethyl phosphate.

In Equation C, above, typical suitable inorganic and organic bases are: alkali metal hydroxides, such as sodium hydroxide, potassium hydroxide, lithium hydroxide; alkali metal carbonates, such as sodium carbonate, potassium carbonate, lithium carbonate; alkaline earth metal hydroxides, such as magnesium hydroxide, barium hydroxide, calcium hydroxide; alkaline earth metal carbonates, such as magnesium carbonate, barium carbonate, calcium carbonate; activated alumina; and quaternary ammonium hydroxides, such as tetraalkyl (lower) ammonium hydroxides, including tetramethylammonium hydroxide, tetrapropylammonium hydroxide, and tetrabenzylammonium hydroxide; and basic ion exchange resins.[1]

The reaction in Equation A hereinabove is carried out at a temperature in the range of 30° C. to 250° C., preferably 60° C. to 180° C. The Equation B reaction, above, is best carried out at a temperature in the range of 5° C. to 150° C. As to Equation C, above, this reaction is generally carried out at a temperature in the range of 20° C. to 180° C., preferably 50° C. to 150° C.

Each of these three reactions may be carried out at atmospheric, sub-atmospheric or super-atmospheric pressure; preferably, however, reaction is carried out at atmospheric pressure. By the same token, the ratio of the reactants in each of Equations A, B and C is not critical, an excess of either reactant, in each equation, with respect

---

[1] Typical are: polymeric quarternary ammonium salts, e.g., polymeric trimethylbenzyl ammonium chloride, etc.

to the other being suitable. In Equation B, however, an excess of about 10% by weight of the acylating agent relative to the phosphonium salt reactant is preferred. Generally in Equations A and C stoichiometric amounts of the reactants are employed.

The reactions of Equation A, above, are best carried out in the presence of an inert organic solvent, i.e., a solvent which does not enter into or otherwise interfere with the reaction under the conditions contemplated herein. Typical solvents are dimethoxyethane, dioxane, ethylacetate, tetrahydrofuran, and the like.

The reactions of Equation B similarly are best carried out in the presence of an inert organic solvent of the type described for Equation A, as well as acetic acid, dimethylformamide, diglyme, and the like.

As to Equation C, typical suitable inert organic solvents in which the phosphonium salt is solvent, which solvents do not interfere or enter into reaction to any substantial degree, are dimethoxyethane, dioxane, dimethylformamide, diglyme, acetonitrile, ethylacetate, tetrahydrofuran, and other like linear and cyclic ethers, acetate esters (lower alkyl).

Alternatively, it has been found pursuant to the instant discovery that the products of Equation A, above, may be converted directly to the products of Equation C, thusly, D

in the presence of any base given above for Equation C and at a temperature in the range of 100° C. to 250° C. As in Equation C, a solvent of the type given hereinabove for Equation C is suitable and herein contemplated. If desired, the reaction may be carried out in the presence of a dehydrating agent, such as a siliceous agent including silica (e.g. silica gel), silica-alumina, and the like, in which other inert organic solvents are also suitable, e.g. aromatic hydrocarbons, such as toluene, benzene, xylene, cymene, and the like, methylene chloride, ethylene chloride, etc.

The products of Equations A, B, C and D above are useful as fire retardants in plastics, e.g., from 0.5 to 30 parts by weight of any one of above compounds when incorporated into 100 parts by weight of a thermoplastic polymer material, such as polyethylene, polypropylene, polystyrene, polyacrylate, polymethylmethacrylate, or the like, provides enhanced fire retardance to the polymer material upon exposure to an open flame.

While the following examples specify certain details as to certain embodiments of the present invention, it is not intended that these details impose unnecessary limitations upon the scope of the instant discovery, excepting of course that these limitations appear in the appended claims:

Example I.—Tributyl-2-hydroxyethylphosphonium tetraphenylborate

Tributyl-2-hydroxyethylphosphonium bromide, obtained from combining tributylphosphine and 2-bromoethanol in 1,2-dimethoxyethane and refluxing under nitrogen, is dissolved in water and treated with excess 0.1 N sodium tetraphenylboron. The resulting precipitate is filtered and recrystallized from ethanol to yield product tributyl-2-hydroxyethylphosphonium tetraphenylborate with melting point 124° C.–125° C. Analysis of product (Found: C, 80.03; H, 9.00; P, 5.35. $C_{38}H_{52}O$ requires: C, 80.55; H, 9.25; P, 5.47%.).

As is evident from this example, the halide salts of Equation A may be converted, in situ or after recovery thereof, to the corresponding tetraphenylborate salts.

Example II.—Tributyl-2-acetoxyethylphosphonium bromide 1,2-dimethoxyethane (275 milliliters), freshly distilled from calcium hydride, 2-bromoethanol (133 grams, 1.06 moles), and tributylphosphine (204 grams, 1.01 moles) are combined under nitrogen and refluxed at 85° C. overnight with stirring. A heavy oil forms within an hour. Isopropenyl acetate (320 grams, 3.2 moles) and 48% HBr (3 drops) are slowly added to the reaction mixture which is then refluxed 18 hours. Volatile components are removed in vacuo at 70° C. Product (372.5 grams; 99.9% yield) remains as a thick hygroscopic oil, which could be forced to crystallize by stirring in a benzene-petroleum ether (boiling point 30° C.–60° C.) mixture. Crystalline tributyl-2-acetoxyethylphosphonium salt is obtained from part of the oily product by freeze drying a benzene solution of the oil.

Example III.—Tributyl-2-acetoxyethylphosphonium tetraphenylborate

Tributyl-2-acetoxyethylphosphonium bromide oil (16.2 grams produced as in Example II, above) is dissolved in water and treated with sodium tetraphenylboron (15 grams) dissolved in water. A white precipitate appears which is filtered and recrystallized from ethanol containing enough acetonitrile to cause solution at the boiling point of the mixture. Tributyl-2-acetoxyethylphosphonium tetraphenylborate (16.7 grams) is obtained with melting point of 177° C.–179° C. Analysis of product (Found: C, 76.65; H, 8.83; P, 5.24. $C_{40}H_{54}O_2BP$ requires: C, 78.93; H, 8.94; P, 5.10%.)

Example IV.—Triphenyl-2-acetoxyethylphosphonium iodide 2-iodoethylacetate is prepared from the nucleophilic exchange reaction of sodium iodide and 2-chloroethylacetate in refluxing acetone under nitrogen (boiling point 86° C.–90° C. at 33 milliliters mercury). Triphenylphosphine (7.35 grams) is reacted with 2-iodoethylacetate (24 grams) under nitrogen with stirring at 80° C. for 4.5 hours. The excess 2-iodoethylacetate is distilled off in vacuo. Crude, brown crystalline product (14.20 grams) is obtained by washing oily residue with ether. It is washed with ether, ethylacetate, and acetone and recrystallized from acetonitrile to give product (7.90 grams) with melting point 161° C.–163° C. Analysis of product (Found: C, 55.16; H, 4.80; I, 26.77; P, 6.45. $C_{22}H_{22}O_2IP$ requires: C, 55.47; H, 4.66; I, 26.66; P, 6.51%.)

Example IV represents still another embodiment of the present invention wherein the product salts of Equation B, above, are prepared directly from the reaction of a 2-haloethyl acetate with a tertiary phosphine of the type contemplated herein.

The process of Example IV, above, may be carried out using any of the tertiary phosphine reactants contemplated herein and the corresponding tri-substituted-2-acetoxyethylphosphonium halide produced and recovered, according to the following equation (E)
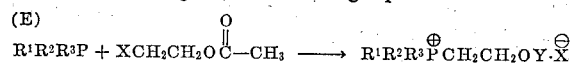

wherein $R^1$, $R^2$, $R^3$, X and Y have the meanings given hereinabove in Equations A and B.

Equation E is best carried out at a temperature in the range of 5° C. to 150° C., preferably at the reflux temperature of the solvent employed. Typical inert organic solvents contemplated for Equation E are acetone, lower alkanol (ethanol, butanol), plus the solvents listed hereinabove for Equation C. The reaction under Equation E, as shown in Example IV, supra, is best carried out under inert conditions, such as under nitrogen. Other 2-haloethyl acetate reactants contemplated herein are 2-bromoethyl acetate and 2-chloroethyl acetate.

Tables A, B, C, D and E, which follow, correspond to Equations A, B, C, D and E, respectively. The examples in Tables A and B are carried out essentially as in Examples I and II, respectively, supra, excepting of course as shown in Tables A and B. The examples in Table C are carried out essentially as in Example LX, infra, excepting of course as shown in Table C. Likewise, the products of Table D are recovered essentially as in Example LX, infra. The examples in Table E are carried out essentially as in Example IV, supra, excepting of course as shown in Table E.

TABLE A $$R^1R^2R^3P + XCH_2CH_2OH \longrightarrow R^1R^2R^3\overset{\oplus}{P}CH_2CH_2OH \cdot \overset{\ominus}{X}$$

| Example No. | R$^1$ | R$^2$ | R$^3$ | Moles R$^1$R$^2$R$^3$P | X | Moles XCH$_2$CH$_2$OH | Solvent | Milliliters of Solvent | Temp., °C. | Product |
|---|---|---|---|---|---|---|---|---|---|---|
| V | CH$_3$ | CH$_3$ | CH$_3$ | 1 | Br | 1.0 | DME $^1$ | 1,500 | 70 | 2-hydroxyethyltrimethylphosphonium bromide. |
| VI | n-C$_4$H$_9$ | n-C$_4$H$_9$ | n-C$_4$H$_9$ | 1 | Cl | 1.0 | DME | 1,500 | 83 | 2-hydroxyethyltributylphosphonium chloride. |
| VII | n-C$_4$H$_9$ | n-C$_4$H$_9$ | n-C$_4$H$_9$ | 1 | Cl | 1.2 | Dioxane | 1,200 | 101 | Do. |
| VIII | n-C$_4$H$_9$ | n-C$_4$H$_9$ | n-C$_4$H$_9$ | 1 | I | 1.2 | ----do---- | 2,000 | 101 | 2-hydroxyethyltributylphosphonium iodide. |
| IX | i-C$_4$H$_9$ | i-C$_4$H$_9$ | i-C$_4$H$_9$ | 1 | Cl | 0.9 | Ethyl acetate. | 1,800 | 50 | 2-hydroxyethyltriisobutylphosphonium chloride. |
| X | n-C$_8$H$_{17}$ | n-C$_8$H$_{17}$ | n-C$_8$H$_{17}$ | 1 | Cl | 1.1 | DME | 1,700 | 83 | 2-hydroxyethyltrioctylphosphonium chloride. |
| XI | n-C$_{12}$H$_{25}$ | n-C$_{12}$H$_{25}$ | n-C$_{12}$H$_{25}$ | 1 | Cl | 1.1 | DME | 1,700 | 83 | 2-hydroxyethyltridodecylphosphonium chloride. |
| XII | C$_{16}$H$_{33}$ | C$_{16}$H$_{33}$ | C$_{16}$H$_{33}$ | 1 | Cl | 1.3 | THF $^2$ | 1,600 | 30 | 2-hydroxyethyltrihexadecylphosphonium chloride. |
| XIII | C$_2$H$_5$ | C$_2$H$_5$ | C$_2$H$_5$ | 1 | Cl | 1.0 | Dioxane | 1,700 | 200 | 2-hydroxyethyltriethylphosphonium chloride. |
| XIV | C$_4$H$_9$ | C$_2$H$_5$ | C$_6$H$_{13}$ | 1 | Cl | 1.1 | Ethyl acetate. | 2,000 | 45 | 2-hydroxyethylbutylethylhexylphosphonium chloride. |
| XV | C$_2$H$_5$ | C$_2$H$_5$ | C$_2$H$_5$O—CH$_2$—CH$_2$ | 1 | Cl | 1.2 | Dioxane | 1,800 | 75 | 2-hydroxyethyldiethyl-2-ethoxyethylphosphonium chloride. |
| XVI |  |  |  | 1 | Br | 1.3 | DME | 1,600 | 60 | 2-hydroxyethyltricyclohexylphosphonium bromide. |
| XVII | 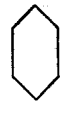 |  |  | 1 | Cl | 0.9 | DME | 2,000 | 80 | 2-hydroxyethyltricyclopentylphosphonium chloride. |
| XVIII |  | 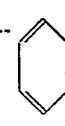 | 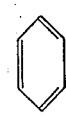 | 1 | I | 1.1 | Dioxane | 1,500 | 90 | 2-hydroxyethyldiphenylnaphthylphosphonium iodide. |
| XIX | 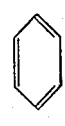 | 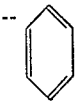 | 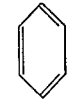 | 1 | I | 1.0 | ----do---- | 2,000 | 101 | 2-hydroxyethyltriphenylphosphonium iodide. |
| XX | 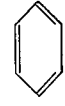 |  | 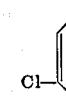 | 1 | Cl | 1.2 | Ethyl acetate. | 1,600 | 65 | 2-hydroxyethyltri(para-chlorophenyl)phosphonium chloride. |
| XXI | 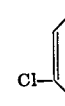 | 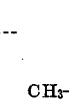 | 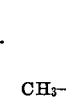 | 1 | Cl | 1.3 | DME | 1,700 | 83 | 2-hydroxyethyltri(para-tolyl)phosphonium chloride. |

$^1$ DME=dimethoxyethane.   $^2$ THF=tetrahydrofuran.

TABLE B $$R^1R^2R^3\overset{\oplus}{P}CH_2CH_2OH\cdot\overset{\ominus}{X} + A \longrightarrow R^1R^2R^3\overset{\oplus}{P}CH_2CH_2OY\cdot\overset{\ominus}{X}$$

| Example No. | Product of Example No. | Moles $R^3\overset{\oplus}{P}CH_2CH_2OH\cdot\overset{\ominus}{X}$ | A | Moles A | Solvent, milliliters (ml.) | Temp., °C. | Product |
|---|---|---|---|---|---|---|---|
| XXII | V | 1.0 | Isopropenyl acetate | 3.2 | DME, 300 ml | 83 | 2-acetoxyethyltrimethylphosphonium bromide. |
| XXIII | VI | 1.0 | Dimethyl sulfate | 3.8 | Dioxane, 300 ml | 90 | 2-methylsulfatoethyltributylphosphonium chloride. |
| XXIV | VII | 0.8 | Acetic anhydride | 1.0 | Acetic acid, 300 ml. | 120 | 2-acetoxyethyltributylphosphonium chloride. |
| XXV | VIII | 0.9 | Nitrosyl chloride | 1.1 | Diglyme | 120 | 2-nitroethyltributylphosphonium iodide. |
| XXVI | IX | 1.0 | Acetyl chloride | 1.2 | DME, 500 ml | 30 | 2-acetoxyethyltriisobutylphosphonium chloride. |
| XXVII | XI | 1.0 | p-Toluenesulfonyl chloride. | 1.0 | DME, 200 ml | 60 | 2-(p-toluenesulfonyloxy)ethyltridodecylphosphonium chloride. |
| XXVIII | XIII | 1.0 | Trimethyl phosphate | 1.1 | Acetic acid, 500 ml. | 80 | 2-dimethylphosphatoethyltriethylphosphonium chloride. |
| XXIX | XII | 1.0 | Propionic acid | 2.4 | DMF,[1] 300 ml | 10 | 2-propionyloxyethyltrihexadecylphosphonium chloride. |
| XXX | XIV | 1.0 | Butanoic anhydride | 1.0 | DMF, 1,000 ml | 30 | 2-butyryloxyethylbutylethylhexylphosphonium chloride. |
| XXXI | XV | 0.8 | Acetic acid | 4.0 | None | 118 | 2-acetoxyethyldiethyl-2-ethoxyethylphosphonium chloride. |
| XXXII | XVI | 0.9 | Acetyl chloride | 1.0 | DME, 200 ml | 65 | 2-acetoxyethyltricyclohexylphosphonium bromide. |
| XXXIII | XVII | 1.0 | Hexanoyl chloride | 1.9 | Dioxane, 150 ml | 25 | 2-hexanoyloxyethyltricyclopentylphosphonium chloride. |
| XXXIV | XIX | 1.0 | Acetic anhydride | 6.0 | None | 100 | 2-acetoxyethyltriphenylphosphonium iodide. |
| XXXV | XVIII | 1.1 | Stearyl chloride | 3.3 | DME, 700 ml | 50 | 2-stearyloxyethyldiphenylnaphthylphosphonium iodide. |
| XXXVI | XX | 1.0 | Dodecanoyl bromide | 4.0 | DMF, 1,000 ml | 40 | 2-dodecanoyloxyethyltri(para-chlorophenyl)phosphonium chloride. |
| XXXVII | XXI | 1.0 | Phenylsulfonyl bromide. | 1.0 | Dioxane, 600 ml | 65 | 2-(phenylsulfonyloxy)ethyltri-(para-tolyl)phosphonium chloride. |
| XXXVIII | V | 1.0 | Ethylchloroformate | 2.0 | Diglyme, 300 ml | 40 | 2-(ethoxycarbonyloxy)ethyltrimethylphosphonium chloride. |
| XXXIX | VII | 0.9 | Dipropyl carbonate | 3.0 | DME, 250 ml | 100 | 2-(propoxycarbonyloxy)ethyltributylphosphonium chloride. |
| XL | VII | 1.0 | Ketene | 1.0 | THF, 500 ml | 75 | 2-acetoxyethyltributylphosphonium chloride. |

[1] DMF = dimethylformamide.

TABLE C $$R^1R^2R^3\overset{\oplus}{P}CH_2CH_2OY\cdot\overset{\ominus}{X} + Base \longrightarrow R^1R^2R^3\overset{\oplus}{P}CH=CH_2\cdot\overset{\ominus}{X}$$

| Example No. | Product of Example No. | Moles of $R^1R^2R^3\overset{\oplus}{P}CH_2CH_2OY\cdot\overset{\ominus}{X}$ | Base | Moles of Base | Solvent,[1] Milliliters (ml.) | Temp., °C. | Product |
|---|---|---|---|---|---|---|---|
| XLI | XXII | 1.0 | $K_2CO_3$ | 1.0 | DME, 300 ml | 83 | Vinyltrimethylphosphonium bromide. |
| XLII | XXIII | 1.0 | $Na_2CO_3$ | 2.0 | Dioxane, 300 ml | 100 | Vinyltributylphosphonium chloride. |
| XLIII | XXIV | 1.0 | $Li_2CO_3$ | 4.0 | Ethyl acetate, 500 ml. | 80 | Do. |
| XLIV | XXV | 2.0 | $Mg(CO_3)$ | 8.0 | Diglyme | 100 | Vinyltributylphosphonium iodide. |
| XLV | XXVI | 0.5 | $Ba(OH)_2$ | 1.0 | Acetonitrile, 500 ml. | 80 | Vinyltriisobutylphosphonium chloride. |
| XLVI | XXVII | 0.9 | $Ca(OH)_2$ | 1.1 | THF, 600 ml | 60 | Vinyltridodecylphosphonium chloride. |
| XLVII | XXVIII | 1.0 | Polymeric trimethylbenzyl ammonium chloride. | 4.0 | DME, 400 ml | 85 | Vinyltriethylphosphonium chloride. |
| XLVIII | XXIX | 1.0 | KOH | 1.0 | THF | 150 | Vinyltrihexadecylphosphonium chloride. |
| XLIX | XXX | 1.0 | HaON | 1.0 | Acetonitrile | 20 | Vinylbutylethylhexylphosphonium chloride. |
| L | XXXI | 1.0 | LiOH | 1.0 | ...do... | 60 | Vinyldiethyl-2-ethoxyethylphosphonium chloride. |
| LI | XXXII | 1.0 | $Mg(OH)_2$ | 3.0 | THF | 72 | Vinyltricyclohexylphosphonium bromide. |
| LII | XXXIII | 2.0 | $Ca(CO_3)$ | 1.0 | Dioxane | 180 | Vinyltricyclopentylphosphonium chloride. |
| LIII | XXXIV | 0.5 | $Ba(CO_3)$ | 1.0 | DME | 81 | Vinyltriphenylphosphonium iodide. |
| LIV | XXXV | 3.0 | Polymeric triethylbenzyl ammonium hydroxide. | 1.0 | Dioxane | 97 | Vinyldiphenylnapthylphosphonium iodide. |
| LV | XXXVI | 1.0 | ...do... | 5.0 | DME | 50 | Vinyltri(para-chlorophenyl)phosphonium chloride. |
| LVI | XXXVII | 1.0 | Activated alumina | 1.0 | THF | 35 | Vinyltri(para-tolyl)phosphonium chloride. |
| LVII | XXXVIII | 1.0 | Tetramethylammonium hydroxide. | 1.7 | Diglyme | 42 | Vinyltrimethylphosphonium bromide. |
| LVIII | XXXIX | 2.0 | Tetrapropylammonium hydroxide. | 1.0 | DMF | 37 | Vinyltributylphosphonium chloride. |
| LIX | XL | 1.0 | Tetrabenzylammonium hydroxide. | 1.0 | DME | 25 | Do. |

[1] When not specified the amount of solvent employed is 500 milliliters.

TABLE D

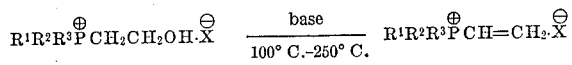

| Example No. | Product of Example No. | Base | Temp., °C. | Dehydrating Agent | 500 Milliliters of Solvent | Product |
|---|---|---|---|---|---|---|
| 1 | VI | $Na_2CO_3$ | 120 | Silica gel [1] | DME | Vinyltributylphosphonium chloride. |
| 2 | XI | $Ca(OH)_2$ | 100 | Silica-alumina [2] | DME | Vinyltridodecylphosphonium chloride. |
| 3 | XII | $Li_2CO_3$ | 220 | | THF | Vinyltrihexadecylphosphonium chloride. |
| 4 | XV | LiOH | 180 | Silica-alumina [2] | Dioxane | Vinyldiethyl-2-ethoxyethylphosphonium chloride. |
| 5 | XVI | $Mg(OH)_2$ | 150 | Silica gel [1] | DME | Vinyltricyclohexylphosphonium bromide. |
| 6 | XVIII | $Na_2CO_3$ | 250 | | Dioxane | Vinyldiphenylnaphthylphosphonium iodide. |
| 7 | XIX | $BaCO_3$ | 205 | | do | Vinyltriphenylphosphonium iodide. |
| 8 | XX | $Na_2CO_3$ | 200 | | DME | Vinyltri(para-chlorophenyl)phosphonium chloride. |
| 9 | XXI | Activated alumina | 175 | | DME | Vinyltri(para-tolyl)phosphonium chloride. |

[1] Finely-divided particulates. [2] Finely-divided particulates.

TABLE E

| Example No. | $R^1R^2R^3P$ | $XCH_2CH_2O\overset{O}{\underset{\|}{C}}-CH_3$ | Temp., °C. | Solvent | Product |
|---|---|---|---|---|---|
| 10 | Tridodecylphosphine | X=Br | Reflux | Ethanol | Tridodecyl-2-acetoxyethylphosphonium bromide. |
| 11 | Tricyclohexylphosphine | X=I | 85 | Acetonitrile | Tricyclohexyl-2-acetoxyethylphosphonium iodide. |
| 12 | Tris(2-chlorophenyl)phosphine | X=Cl | Reflux | Acetone | Tris(2-chlorophenyl)-2-acetoxyethylphosphonium chloride. |
| 13 | Tri(2-methoxypentyl)phosphine | X=I | 50 | Dioxane | 2-acetoxyethylphosphonium iodide. |

By finely-divided particulates in Table D is intended 28 to 200 mesh. Larger or smaller particulates are likewise within the purview of the instant discovery.

Example LX.—Tributylvinylphosphonium bromide

Tributyl - 2 - acetoxyethylphosphonium bromide (23.7 millimoles) is dissolved in 1,2-dimethoxyethane (25 milliliters) and sodium carbonate (5.0 grams, 47 millimoles) is added. The mixture is stirred at reflux under nitrogen for 8 hours. The solid is filtered off and washed with hot 1,2-dimethoxyethane. The combined filtrates are evaporated to leave a semi-solid residue. Recrystallization from ethyl acetate yields product tributylvinylphosphonium bromide (3.3 grams, 10.7 millimoles, 45% yield with melting point 148° C.–150° C.). Further recrystallization from ethylacetate-acetonitrile raises the melting point to 151.5° C. to 152.5° C.

Pursuant to the present discovery, the products of Tables B, C, D and E, hereinabove, may be converted to their corresponding sulfur-containing derivatives by reaction with sulfhydryl (e.g., an alkyl mercaptan, an alkane dithiol, a benzenethiol, a dialkylphosphorodithioate, an O,O-dialkylphosphorodithiolate, and the like) at a temperature in the range 20° C. to 200° C. Table F, G, H which follows illustrates this reaction, the examples in said table being carried out essentially as in Example LXXVI, infra, excepting of course as specified in the table:

TABLES F, G, H (F) $R^1R^2R^3\overset{\oplus}{P}CH=CH_2 \cdot \overset{\ominus}{X} + R(SH)_n \xrightarrow{\text{base}} [R^1R^2R^3\overset{\oplus}{P}CH_2CH_2S]_n \cdot R \cdot \overset{\oplus}{X}$ $R^1R^2R^3\overset{\oplus}{P}CH_2CH_2OY \cdot \overset{\ominus}{X} + R(SH)_n \xrightarrow{\text{base}} $ (G) $R^1R^2R^3\overset{\oplus}{P}CH=CH_2 \cdot \overset{\ominus}{X} + \underset{A'}{\overset{A}{\diagdown}}\underset{}{PSH} \xrightarrow{\text{base}} \left[R^1R^2R^3\overset{\oplus}{P}CH_2CH_2S\underset{A'}{\overset{A}{\diagdown}}P\right] \overset{\ominus}{X}$ $R^1R^2R^3\overset{\oplus}{P}CH_2CH_2OY \cdot \overset{\ominus}{X} + \underset{A'}{\overset{A}{\diagdown}}PSH \xrightarrow{\text{base}}$ (H) $R^1R^2R^3\overset{\oplus}{P}CH=CH_2 \cdot \overset{\ominus}{X} + \underset{Q \;\;\; Q'}{\underset{C-N}{\overset{C-SH}{\underset{\diagdown}{Z}\diagup}}} \xrightarrow{\text{base}} \left[R^1R^2R^3\overset{\oplus}{P}CH_2CH_2S-\underset{Q\;\;Q'}{\underset{C-N}{\overset{C}{\underset{\diagdown}{Z}\diagup}}}\right]\overset{\ominus}{X}$ $R^1R^2R^3\overset{\oplus}{P}CH_2CH_2OY \cdot \overset{\ominus}{X} + \underset{Q\;\;Q'}{\underset{C-N}{\overset{C-SH}{\underset{\diagdown}{Z}\diagup}}} \xrightarrow{\text{base}}$

| Example No. | (1) Product of Example No. | Moles of (1) | (2) Sulfhydryl | Moles of (2) | Base | 500 Milliliters of Solvent | Temp., °C. | Products |
|---|---|---|---|---|---|---|---|---|
| LXI | XLI | 1.0 | $CH_3SH$ | 1.0 | ------ | Dioxane | 22 | $[(CH_3)_3PCH_2CH_2SCH_3]\overset{\oplus}{}Br\overset{\ominus}{}$ |
| LXII | XXIX | 1.0 | $CH_3(CH_2)_5CH_2SH$ | 1.5 | NaOH | THF | 35 | $[(C_{10}H_{21})_3PCH_2CH_2SCH_2(CH_2)_5CH_3]\overset{\oplus}{}Cl\overset{\ominus}{}$ |
| LXIII | XLVII | 1.5 | $(CH_3)_3SiCH_2SH$ | 1.0 | LiOH | DME | 60 | $[(C_2H_5)_3PCH_2CH_2SCH_2Si(CH_3)_3]\overset{\oplus}{}Cl\overset{\ominus}{}$ |
| LXIV | XXV | 1.0 | $(C_6H_{13})_3SiCH_2SH$ | 1.0 | LiOH | DMF | 70 | $[(C_4H_9)_3PCH_2CH_2SCH_2Si(C_6H_{13})_3]\overset{\oplus}{}I\overset{\ominus}{}$ |
| LXV | XLIX | 2.0 | $HSCH_2CH_2SH$ | 1.0 | $Na_2CO_3$ | THF | 50 | $[(C_2H_5)(C_4H_9)(C_6H_{13})PCH_2CH_2SCH_2CH_2SCH_2CH_2P(C_6H_{13})(C_4H_9)(C_2H_5)]\overset{\oplus}{}{}_2Cl\overset{\ominus}{}$ |
| LXVI | XXXI | 2.0 | $HSCH_2(CH_2)_{10}CH_2SH$ | 1.0 | KOH | Ethyl acetate | 31 | $[(C_2H_5)_2(CH_2CH_2)PCH_2CH_2SCH_2(CH_2)_{10}CH_2SCH_2CH_2P(CH_2CH_2)(C_2H_5)_2]\overset{\oplus}{}{}_2Cl\overset{\ominus}{}$<br>$OC_2H_5 \qquad\qquad\qquad\qquad\qquad\qquad\qquad\qquad\qquad\qquad OC_2H_5$ |
| LXVII | XXXIII | 1.0 | ⌬—$CH_2SH$ | 2.0 | $Ca(OH)_2$ | THF | 200 | $\left[\left(⌬\right)_3 -PCH_2CH_2SCH_2-⌬\right]\overset{\oplus}{}Cl\overset{\ominus}{}$ |

| Example No. | (1) Product of Example No. | Moles of (1) | (2) Sulfhydryl | Moles of (2) | Base | 500 Milliliters of Solvent | Temp., °C. | Products |
|---|---|---|---|---|---|---|---|---|
| LXVIII | LIII | 1.0 | naphthalene-SH | 3.0 | Na₂CO₃ | Dioxane | 130 | [naphthyl-PCH₂CH₂S-]⊕ I⊖ |
| LXIX | XXV | 1.2 | C₆H₅-SH | 1.0 |  | CH₃CN | 82 | [(C₄H₉)₃PCH₂CH₂S-C₆H₅]⊕ I⊖ |
| LXX | LIV | 0.8 | 2,4-(CH₃)₂C₆H₃-SH | 1.0 |  | THF | 70 | [(4-Cl-C₆H₄)-PCH₂CH₂S-2,4-(CH₃)₂C₆H₃]₃⊕ Cl⊖ |
| LXXI | XXXVII | 1.0 | thiazoline-CSH | 4.0 | (CH₃)₃N | Diglyme | 50 | [3-CH₃-C₆H₄-PCH₂CS-thiazoline]⊕ Cl⊖ |
| LXXII | LVII | 1.7 | benzoxazole-CSH | 1.0 | (C₆H₅)NOH | DMF | 10 | [(CH₃)₃PCH₂CS-benzoxazole]⊕ Br⊖ |
| LXXIII | XXXIX | 2.0 | C₂H₅,CH₃-thiazolidine-CSH | 3.5 | Activated alumina | DME | 21 | [(C₄H₉)₃PCH₂CS-C₂H₅,CH₃-thiazolidine]⊕ Cl⊖ |
| LXXIV | LIX | 1.0 | (C₄H₉O)₂P(S)SH | 3.5 | Activated alumina | DME | 90 | [(C₄H₉)₃PCH₂CH₂SP(S)(C₄H₉O)₂]⊕ Cl⊖ |
| LXXV | XXXIV | 1.0 | (C₂H₅O)₂P(S)SH | 2.0 | MgCO₃ | Dioxane | 70 | [C₆H₅-PCH₂CH₂SP(S)(OC₂H₅)₂]₃⊕ I⊖ |

EXAMPLE LXXVI

Potassium O,O-diethylphosphorodithiolate (13.0 grams, 0.06 mole) is dissolved in 50 milliliters of acetone and added dropwise to a stirred solution of tributylvinylphosphonium bromide (15.4 grams, 0.05 mole) in 50 milliliters of acetone. After standing overnight at room temperature, the mixture is filtered to remove precipitated potassium bromide and the acetone filtrate is treated with 10 milliliters of 10% hydrobromic acid. Upon treating the resulting mixture with diethyl ether the product phosphonium salt.

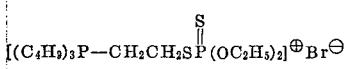

is obtained in nearly quantitative yield as a viscous syrup.

Obviously, from Tables F, G, H, the symbols $R^1$, $R^2$, $R^3$, Y and X have the meanings given hereinabove in correspond Equations A, B, C, D and E. The remaining symbols in Equations F, G and H of Tables F, G, H have the following meanings:

R represents alkyl or alkylene having from 1 to 12 carbon atoms; benzyl; trialkylsilyl in which the alkyl moiety has from 1 to 8 carbon atoms; benzene; toluene; xylene; and 2-napthtylene.

n is selected from 1 and 2.

A and A' each represent lower alkyl and lower alkoxy.

Q and Q' each represent H, lower alkyl, or, when taken together, the residue of the phenyl radical.

Z represents S or O.

As is evident from Tables F, G, H, above, the reactions contemplated therein using 2-acetoxyethylphosphonium salts as reactants are carried out in the presence of a base of the type illustrated hereinabove for Equation C. By the same token, the vinylphosphonium salt reactants of Equations F, G and H, respectively, of Tables F, G, H may be reacted as shown in said table using or omitting a base. Furthermore, the solvents of Equation C, supra, are contemplated for the reactions of Equations F, G and H, as well as atmospheric, sub-atmospheric and super-atmospheric conditions. Similarly, an excess of either reactant with respect to the other is contemplated, although stoichiometric amounts are generally employed. It will be noted from Tables F, G, H (cf. particularly Example LXXI) that tertiary alkyl (lower) amines are likewise contemplated as bases. The amount of base used in the examples of Tables F, G, H is 1 percent, based upon the total weight of reactants 1 and 2. Generally, from about .01 percent to about 10 percent may be used.

The products of Equations F, G, H are useful as fire retardants in plastics in the same manner described hereinabove for the products Equations A, B, C and D.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

What is claimed is:

1. The compound of the formula

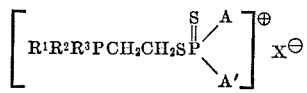

wherein $R^1$, $R^2$, and $R^3$ each represent a member selected from the group consisting of alkyl $C_1$–$C_{16}$, substituted alkyl $C_1$–$C_{16}$, cycloalkyl, phenyl, substituted phenyl, and naphthyl, said substituents for alkyl being selected from the group consisting of lower alkoxy and cyano and said substituents for phenyl being selected from the group consisting of lower alkyl and bromine, chlorine or iodine; A and A' each represent a member from the group consisting of lower alkyl and lower alkoxy; X represents bromine, chlorine or iodine.

2. The compound of the formula

3. A method which comprises bringing into reactive contact the phosphonium salt of the formula

and a sulfhydryl of the formula

in the presence of an inert organic solvent and recovering the corresponding salt of the formula

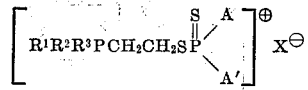

$R^1$, $R^2$, and $R^3$ in the above formulae each represent a member selected from the group consisting of alkyl $C_1$–$C_{16}$, substituted alkyl $C_1$–$C_{16}$, cycloalkyl, phenyl, substituted phenyl, and naphthyl, said substituents for alkyl being selected from the group consisting of lower alkoxy and cyano and said substituents for phenyl being selected from the group consisting of lower alkyl and bromine, chlorine or iodine; X represents bromine, chlorine or iodine; A and A' each represent a member from the group consisting of lower alkyl and lower alkoxy.

4. A method which comprises bringing into reactive contact a phosphonium salt of the formula

and a sulfhydryl of the formula

in the presence of an inert organic solvent and a base and recovering the corresponding salt of the formula

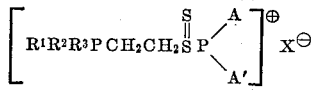

$R^1$, $R^2$, and $R^3$ in the above formulae each represent a member selected from the group consisting of alkyl $C_1$–$C_{16}$, substituted alkyl $C_1$–$C_{16}$, cycloalkyl, phenyl, substituted phenyl, and naphthyl, said substituents for alkyl being selected from the group consisting of lower alkoxy and cyano and said substituents for phenyl being selected from the group consisting of lower alkyl and bromine, chlorine or iodine; X represents bromine, chlorine or iodine; A and A' each represent a member from the group consisting of lower alkyl and lower alkoxy; Y represents the acidic residue of an esterifying agent.

References Cited

UNITED STATES PATENTS

| | | | |
|---|---|---|---|
| 2,632,020 | 3/1953 | Hoegberg | 260—978 X |
| 2,794,041 | 5/1957 | Norman et al. | 260—978 X |
| 2,972,628 | 2/1961 | McConnell et al. | 260—982 X |

CHARLES B. PARKER, *Primary Examiner.*

A. SUTTO, *Assistant Examiner.*